United States Patent [19]

Jejelowo

[11] Patent Number: 5,602,217
[45] Date of Patent: Feb. 11, 1997

[54] PROCESS OF POLYMERIZATION USING AGED ACTIVATORS

[75] Inventor: Moses O. Jejelowo, Kingwood, Tex.

[73] Assignee: Exxon Chemical Patents Inc., Wilmington, Del.

[21] Appl. No.: 515,788

[22] Filed: Aug. 16, 1995

Related U.S. Application Data

[62] Division of Ser. No. 271,598, Jul. 7, 1994, Pat. No. 5,468,702.

[51] Int. Cl.$^6$ .................................................. C08F 4/648
[52] U.S. Cl. ........................ 526/129; 526/160; 526/943
[58] Field of Search ............................ 526/92, 129, 160, 526/943

[56] References Cited

U.S. PATENT DOCUMENTS

| | | | |
|---|---|---|---|
| 4,808,561 | 2/1989 | Welborn, Jr. | 502/104 |
| 5,106,804 | 4/1992 | Bailly et al. | 502/108 |
| 5,147,949 | 9/1992 | Chang | 526/129 |
| 5,308,817 | 5/1994 | Reddy et al. | 502/117 |
| 5,473,028 | 12/1995 | Nowlin et al. | 526/114 |

*Primary Examiner*—Romulo H. Delmendo
*Attorney, Agent, or Firm*—Jaimes Sher; C. Paige Schmidt

[57] ABSTRACT

This invention is generally directed toward a catalyst system useful for polymerizing olefins. The method for preparing the catalyst of the invention provides for combining a bulky ligand transition metal catalyst with an activator that has been aged, optionally with a support. The catalyst system is useful in any polymerization process.

10 Claims, No Drawings

PROCESS OF POLYMERIZATION USING AGED ACTIVATORS

This is a divisional of application Ser. No. 08/271,598, filed Jul. 7, 1994, now U.S. Pat. No. 5,468,702.

FIELD OF THE INVENTION

This invention relates to catalysts, catalyst systems and to methods for their production and use in olefin polymerization. The invention particularly relates to a process for preparing a bulky ligand transition metal catalyst system for use in the gas phase, slurry phase or liquid/solution phase.

BACKGROUND OF THE INVENTION

A new catalyst technology has developed which provides for the modification and/or control over the properties and characteristics of a polymer.

These new catalysts are referred to as bulky ligand transition metal catalysts which are formed from a bulky ligand transition metal compound and an activator. The bulky ligand of the transition metal compound may contain a multiplicity of bonded atoms, preferably carbon atoms and typically contain a cyclic structure such as, for example, a cyclopentadienyl ligand or a substituted cyclopentadienyl ligand, or any other ligand capable of η-5 bonding to the transition metal. The transition metal is typically a Group 4, 5 or 6 transition metal or may be a metal from the lanthanide and actinide series. Other ligands may be bonded to the transition metal, such as but not limited to hydrocarbyl, halogen or any other anionic ligand. Generally, in the art, these bulky ligand catalysts are referred to as metallocene catalysts.

U.S. Pat. No. 5,308,817, herein incorporated by reference, discusses that storage of a metallocene/methylalumoxane solution at room temperature under nitrogen for several days resulted in gradual increases in polymer yields with specific syndiospecific metallocenes.

It would be highly desirable to have a process for producing higher activity polymerization catalyst systems that are independent of the bulky ligand transition metal catalyst component or metallocene.

SUMMARY OF THE INVENTION

This invention is generally directed towards a new polymerization catalyst system, to methods for its manufacture and to its use in a polymerization process.

In one embodiment an improved method is provided to produce a bulky ligand transition metal catalyst system by contacting a metallocene catalyst component with an activator that has been aged.

In another embodiment the bulky ligand transition metal catalyst system described above is supported on a carrier.

In yet another embodiment of the invention, there is provided a process for producing polyolefins by contacting olefin monomer, optionally with comonomer in the presence of the catalyst systems described above.

In yet another embodiment there is provided a catalyst system produced by the improved method.

DETAILED DESCRIPTION OF THE INVENTION

Introduction

This invention is generally directed toward a catalyst system, preferably a supported catalyst system, useful for polymerizing olefins. The method for forming the catalyst system of the invention involves contacting a metallocene catalyst component or compound with an activator or a cocatalyst that has been aged.

It has been discovered that in forming the catalyst system of the invention, where the activator has been stored for a period of time or aged the activity of the resulting catalyst system produced with the aged activator increases. In addition to the increase in polymer yields, the process of the invention permits the reduced loading of the catalyst and activator components. This reduction in loading results in a more cost effective catalyst system. Also, it has been discovered that high loadings can result in an increase of a catalyst systems tendency to sheet or foul during polymerization. Reducing the loading typically reduces catalyst activity and sheeting and fouling tendencies, however, using the process of this invention catalyst activity can be maintained or even increased.

Catalyst Components of the Invention

Metallocene catalysts, for example, are typically those bulky ligand transition metal compounds derivable from the formula:

where L is a bulky ligand; A is leaving group, M is a transition metal and m and n are such that the total ligand valency corresponds to the transition metal valency. Preferably the catalyst is four co-ordinate such that the compound is ionizable to a $1^+$ valence state.

The ligands L and A may be bridged to each other, and if two ligands L and/or A are present, they may be bridged. The metallocene compound may be full-sandwich compounds having two or more ligands L which may be cyclopentadienyl ligands or cyclopentadiene derived ligands or half-sandwich compounds having one ligand L, which is a cyclopentadienyl ligand or derived ligand.

The metallocene compounds contain a multiplicity of bonded atoms, preferably carbon atoms, and typically contain a cyclic structure such as, for example, a substituted or unsubstituted cyclopentadienyl ligand, or cyclopentadienyl derived ligand or any other ligand capable of η-5 bonding to the transition metal atom. One or more bulky ligands may be π-bonded to the transition metal atom. The transition metal atom may be a Group 4, 5 or 6 transition metal and/or a metal from the lanthanide and actinide series. Other ligands may be bonded to the transition metal, such as a leaving group, such as but not limited to hydrocarbyl, halogen or any other univalent anionic ligand. Non-limiting examples of metallocene catalysts and catalyst systems are discussed in for example, U.S. Pat. Nos. 4,530,914, 4,952,716, 5,124,418, 4,808,561, 4,897,455, 5,278,119, 5,304,614 all of which are herein fully incorporated by reference. Also, the disclosures of EP-A-0129,368, EP-A-0520732, EP-A-0420436, WO 91/04257 WO 92/00333, WO 93/08221, and WO 93/08199 are all fully incorporated herein by reference.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al., 5,324,800 and EP-A-0 129 368, and U.S. Pat. Nos. 5,017,714 and 5,120,867 all of which are fully incorporated herein by reference. These publications teach the structure of the metallocene catalysts and include alumoxane as the cocatalyst. There are a variety of methods for preparing alumoxane, non-limiting examples of which are described in U.S. Pat. Nos. 4,665,208, 4,952,540, 5,091, 352, 5,206,199, 5,204,419, 4,874,734, 4,924,018, 4,908,463, 4,968,827, 5,308,815, 5,248,801, 5,235,081, 5,157,137, 5,103,031 and EP-A-0 561 476, EP-B1-0 279 586, EP-A-0 594-218 and WO 94/10180, all of which incorporated herein by reference.

Further, the metallocene catalyst component of the invention can be a monocyclopentadienyl heteroatom containing compound. This heteroatom is activated by either an alumoxane, an ionizing activator, a Lewis acid or a combination thereof to form an active polymerization catalyst system. These types of catalyst systems are described in, for example, PCT International Publication WO 92/00333, WO 94/07928, and WO 91/04257, WO 94/03506, U.S. Pat. Nos. 5,057,475, 5,096,867, 5,055,438, 5,198,401, 5,227,440 and 5,264,405 and EP-A-0 420 436, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. Nos. 5,064,802, 5,149,819, 5,243,001, 5,239,022, 5,276,208, 5,296,434, 5,321,106 and 5,304,614, PCT publications WO 93/08221 and WO 93/08199 and EP-A- 0 578 838 all of which are herein incorporated by reference.

The preferred transition metal component of the catalyst of the invention are those of Group 4, particularly, zirconium, titanium and hafnium. The transition metal may be in any oxidation state, preferably +3 or +4 or a mixture thereof. All the catalyst systems of the invention may be, optionally, prepolymerized or used in conjunction with an additive or scavenging component to enhance catalytic productivity, see for example PCT publication WO 94/07927 incorporated herein by reference.

For the purposes of this patent specification the term "metallocene" is defined to contain one or more unsubstituted or substituted cyclopentadienyl or cyclopentadienyl moiety in combination with a transition metal. In one embodiment the metallocene catalyst component is represented by the general formula $(C_p)_m MR_n R'_p$ wherein at least one $C_p$ is an unsubstituted or, preferably, a substituted cyclopentadienyl ring symmetrically or unsymetrically substituted; M is a Group 4, 5 or 6 transition metal; R and R' are independently selected halogen, hydrocarbyl group, or hydroearboxyl groups having 1–20 carbon atoms or combinations thereof; m=1–3, n=0–3, p=0–3, and the sum of m+n+p equals the oxidation state of M.

In another embodiment the metallocene catalyst component is represented by the formulas:

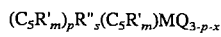

and

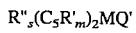

wherein M is a Group 4, 5, 6 transition metal, at least one $C_5R'_m$ is a substituted cyclopentadienyl, each R', which can be the same or different is hydrogen, alkyl, alkenyl, aryl, alkylaryl or arylalkyl radical having from 1 to 20 carbon atoms or two carbon atoms joined together to form a pan of a substituted or unsubstituted ring or tings having 4 to 20 carbon atoms, R" is one or more of or a combination of a carbon, a germanium, a silicon, a phosphorous or a nitrogen atom containing radical bridging two $(C_5R'_m)$ rings, or bridging one $(C_5R'_m)$ ring back to M, when p=0 and x=1 otherwise "x" is always equal to 0, each Q which can be the same or different is an aryl, alkyl, alkenyl, alkylaryl, or arylalkyl radical having from 1 to 20 carbon atoms, halogen, or alkoxides, Q' is an alkylidene radical having from 1–20 carbon atoms, s is 0 or 1 and when s is 0, m is 5 and p is 0, 1 or 2 and when s is 1, m is 4 and p is 1.

For the purposes of this patent specification, the terms "cocatalysts" and "activators" are used interchangeably and are defined to be any compound or component which can activate a bulky ligand transition metal compound or a metallocene, as defined above. It is within the scope of this invention to use alumoxane as an activator, and to also use ionizing activators, neutral or ionic, or compounds such as tri (n-butyl) ammonium tetra bis(pentafluorophenyl) boron, which ionize the neutral metallocene compound. Such ionizing compounds may contain an active proton, or some other cation associated with but not coordinated or only loosely coordinated to the remaining ion of the ionizing compound. Such compounds and the like are described in EP-A-0520 732, EP-A-500 944, EP-A-0 277 003 and EP-A-0 277 004, and U.S. Pat. Nos. 5,153,157, 5,198,401, and 5,241,025 are all herein fully incorporated by reference. Combinations of activators are also comemplated by the invention, for example, alumoxane and ionizing activators in combinations, see for example, WO 94/07928.

The preferred activator is alumoxane and even more preferred is alumoxane produced in situ as described in various U.S. Pat. Nos. 5,008,228, 5,086,025 and 5,147,949 all of which are herein incorporated by reference.

For purposes of this patent specification the terms "carrier" or "support" are interchangeable and can be any support material, preferably a porous support material, such as for example, talc, inorganic oxides, inorganic chlorides, for example magnesium chloride and resinous support materials such as polystyrene polyolefin or polymeric compounds or any other organic support material and the like.

The preferred support materials are inorganic oxide materials, which include those from the Periodic Table of Elements of Groups 2, 3, 4, 5, 13 or 14 metal oxides. In a preferred embodiment, the catalyst support materials include silica, alumina, silica-alumina, and mixtures thereof. Other inorganic oxides that may be employed either alone or in combination with the silica, alumina or silica-alumina are magnesia, titania, zirconia, and the like.

It is preferred that the carder of the catalyst of this invention has a surface area in the range of from about 10 to about 700 m²/g, pore volume in the range of from about 0.1 to about 4.0 cc/g and average particle size in the range of from about 10 to about 500 μm. More preferably, the surface area is in the range of from about 50 to about 500 m²/g, pore volume of from about 0.5 to about 3.5 cc/g and average particle size of from about 20 to about 200 μm. Most preferably the surface area range is from about 100 to about 400 m²/g, pore volume from about 0.8 to about 3.0 cc/g and average particle size is from about 30 to about 100 μm. The pore size of the carder of the invention typically is in the range of from 10 to 1000° A., preferably 50 to about 500° A., and most preferably 75 to about 350° A.

Method of Producing the Catalyst System of the Invention

The catalyst system of the invention can be made in a variety of different ways.

The activator of the invention can be stored by any reasonable method under any reasonable conditions as is well known in the art. The activator of the invention can be stored at various temperatures, pressures, in various liquids under a variety of inert gases, etc.

The longer the length of time the activator is stored the more active the catalyst system of the invention becomes. It is within the scope of this invention to reduce the storage time of the activator by modifying the storage conditions in and under which the activator is kept. Non-limiting examples of storage conditions, such as temperature, pressure, type of gas, or solvent etc. in and under which the activator is subjected to. Other storage conditions that can be altered include the container in which the activator is kept or whether the activator is kept undisturbed or continuously or semi-continuously agitated.

For the purposes of this patent specification and appended claims the term an "aged activator" is an activator that has been stored for a period of time from the time of its initial manufacture until its use in the methods of the invention or has been subjected to conditions that accelerate the aging process and thereby reducing storage time from the time the activator is prepared.

In one embodiment the aged activator of the invention is stored under ambient conditions from the time of its manufacture for a period of time greater than about 24 hours, preferably greater than about 168 hours, more preferably greater than about 336 hours, even more preferably greater than about 672 hours and still even more preferably greater than about 840 hours and most preferably greater than about 1000 hours.

In another embodiment the aged activator is stored with, on or in the support material for a period of time as above.

In the preferred embodiment the activator is alumoxane that is prepared by contacting a water containing support with an organo metallic compound, preferably trimethylaluminum, in a solvent. The resulting slurry is then stored at room temperature under nitrogen for several days, weeks, months or even years or stored under storage conditions previously discussed that would accelerate the aging process and reduce storage time.

Preferably the mole ratio of the metal of the organometallic compound to water present in the support is in the range of from 0.7 to 10, preferably 0.8 to 6, even more preferably 0.9 to 4, still even more preferably 0.9 to 3 and most preferably 0.9 to 1.3. The mole ratio and length of aging time of the activator can be adjusted to achieve a desired end result, for example, a particular activity or product capability.

In one embodiment the "aged activator" is a translucent solution that is hazy and/or contains gels even after shaking or stirring the solution vigorously after a period of aging.

The catalyst system of the invention can be formed by any method well known in the art, some of which have been described in the various references cited in this patent specification.

The metallocene component, the aged activator and optionally the support can be combined in a variety of ways. Non-limiting embodiments of the invention are as follows. (1) The metallocene can be added to the aged activator or vice-versa. (2) The combination of the metallocene and aged activator of the invention can be contacted with a support material or vice-versa. The activator of the invention can be contacted with a support material first followed by the addition of the metallocene. (3) A metallocene catalyst component of the invention can be contacted with a support material first, followed by the addition of the aged activator of the invention. (4) The aged activator of the invention can be formed in situ on or in a support material, followed by the addition of the metallocene catalyst component. (5) The aged activator of the invention can be separately supported from the metallocene catalyst component with or without an aged activator or any other activator or combination. (6) The aged activator of the invention can be added directly into the polymerization reactor in a supported, liquid, dry or slurry form in combination with or without a metallocene catalyst component. (7) The aged activator of the invention can be combined with any other activator in any of the previous non-limiting embodiments.

In another embodiment of the invention, the mole ratio of the metal of the aged activator component to the transition metal of the metallocene component is in the range of ratios between 0.3:1 to 1000:1, preferably 20:1 to 800:1, and most preferably 50:1 to 500:1. In another embodiment where the aged activator is an ionizing activator as previously described the mole ratio of the metal of the activator component to the transition metal component is in the range of ratios between 0.3:1 to 3:1.

It is within the scope of this invention to wash the catalyst system of the invention in a liquid, such as hexane, after its partial or complete formation and then dry the catalyst system or portion of the catalyst system to remove excess liquid.

It is within the scope of this invention to add the metallocene catalyst component and aged activator of the invention to a porous support such that the total volume of the metallocene catalyst component and the aged activator is less than about four times, preferably less than 3 times and most preferably less than 2.5 times the pore volume of the support material.

In another embodiment of the invention, the supported catalyst system of the invention includes a modifying agent, for example, those described in U.S. Pat. No. 5,283,278, fully incorporated herein by reference. Non-limiting examples of modifying agents include, alcohol, thiol, silanol, diol, ester, ketone, aldehyde, acid, amine, and ether compounds. Tertiary amine compounds are preferred. The modifying agent can be added at any stage in the formation of the supported catalyst system of the invention, however, it is preferred that it is added after the supported catalyst system of the invention is formed, in either a slurry or dried state.

In another embodiment of the invention, the supported catalyst system of the invention includes a polyolefin wax or tackifier or the like.

Polymerization Process of the Invention

The catalyst system of this invention is suited for the polymerization of monomers and optionally comonomers in any polymerization or prepolymerization process, gas, slurry or solution phase; even a high pressure autoclave process can be utilized. In the preferred embodiment a gas phase or slurry phase process is utilized, most preferably a gas phase process is used.

In the preferred embodiment, this invention is directed toward the slurry or gas phase polymerization or copolymerization reactions involving the polymerization or optionally prepolymerization of one or more of the alpha-olefin monomers having from 2 to 20 carbon atoms, preferably 2–12 carbon atoms. The invention is particularly well suited to the copolymerization reactions involving the polymerization of one or more of the monomers, for example alpha-olefin monomers of ethylene, propylene, butene-1, pentene- 1, 4-methylpentene-1, hexene-1, octene-1, decene-1, and cyclic olefins and styrene. Other monomers can include polar vinyl, diolefins such as dienes, norbornene, norboradiene, acetylene and aldehyde monomers. Preferably a copolymer of ethylene or propylene is produced. Preferably the comonomer is an alpha-olefin having from 3 to 15 carbon atoms, preferably 4 to 12 carbon atoms and most preferably 4 to 10 carbon atoms. In another embodiment ethylene or propylene is polymerized with at least two comonomers to form a terpolymer and the like.

In one embodiment of the process of the invention, the olefin(s) are prepolymerized in the presence of the catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. No. 4,923,833 and 4,921,825 and EP-B-0279 863, published Oct. 14, 1992 all of which are incorporated fully herein by reference. All the catalyst systems of the invention may be optionally prepolymerized or used in conjunction with an additive or scavenging component to enhance catalytic productivity.

Typically in a gas phase polymerization process a continuous cycle is employed where in one pan of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670 and U.S. application Ser. No. 053,067, filed Apr. 26, 1993, now U.S. Pat. No. 5,352,740 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

A slurry polymerization process generally uses pressures in the range of about 1 to about 500 atmospheres and even greater and temperatures in the range of −60° C. to about 280° C. In a slurry polymerization, a suspension of solid, particulate polymer is formed in a liquid polymerization medium to which ethylene and comonomers and often hydrogen along with catalyst are added. The liquid employed in the polymerization medium can be alkane or cycloalkane, or an aromatic hydrocarbon such as toluene, isobutylene, ethylbenzene or xylene. The medium employed should be liquid under the conditions of polymerization and relatively inert. Preferably, hexane or isobutane is employed.

In some instances where it is necessary to improve processability and manipulate final end product characteristics the polymers produced by this present invention can be blended or coextruded into single or multilayer films or the like with various other polymers and compounds well known in the art, for instance, LLDPE, LDPE, high and low high density polyethylene, polypropylene, PB, EMA, EVA, copolymers of acrylic acid, polymethylacrylate or any other polymers such as polyvinylchloride, polybutene-I, isotactic polybutene, ABS resins, ethylene-propylene rubber, vulcanized ethylene-propylene rubber, EPDM block copolymer elastomers, copolymers of ethylene and vinyl alcohol, polystyrene, nylons, PET resins, crosslinked polyethylenes, poly-1-esters, graft copolymers, polyacrylonitrile homopolymers or copolymers, thermoplastic polyamides, polyacetal, polyvinylidine fluoride and other fluorinated elastomers, polyethylene glycols, polyisobutylene, terpene resins and other tackifying polymers and the like and combinations thereof.

In many applications it will desirable to combine the polymer of the invention with anti-oxidants, slip, anti-block, processing aids, pigments, ultra-violet inhibitors, antistatic agents, or other additives. The polymers produced by the process of the invention are useful in such forming operations as film, sheet, and fiber extrusion and co-extrusion as well as blow molding, injection molding and rotary molding. Films include blown or cast films in mono-layer or multilayer constructions formed by co-extrusion or by lamination. Such films are useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers and toys, etc.

EXAMPLES

In order to provide a better understanding of the present invention including representative advantages and limitations thereof, the following examples are offered.

Density is measured in accordance with ASTM-D-1238. The ratio of Mw/Mn can be measured directly by gel permeation chromatography techniques. For the purposes of this patent specification the Mw/Mn of a polymer is determined with a Waters Gel Permeation Chromatograph equipped with Ultrastyrogel columns and a refractive index detector. In this development, the operating temperature of the instrument was set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.

Comparative Example 1

10 wt-% Trimethyl aluminum (TMA) in isopentane (3380 cm$^3$) was measured into a 5-liter flask at 0° C. 400 g of Davison 948 silica having Loss-On-Ignition (LOI) of 11.14% was added slowly to the TMA solution. (The weight percent water is measured by determining the weight loss of the support material which has been heated and held at a temperature of about 1000° C. for about 16 hours. This is known as the LOI procedure.) After all the silica had been added, the temperature was raised to 35° C. and the isopentane solvent was removed under vacuum to give a free-flowing powder. A sample of the powder (10 g) was suspended in 60 cm$^3$ heptane at 60° C. To this slurry was added a solution of 0.2925 g ("PentCp)$_2$ZrCl$_2$ in toluene (40 cm$^3$). Stirring was continued for 1.5 h and then the solvent was removed under vacuum to give a free-flowing catalyst.

The supported catalyst described above was used in polymerizing ethylene in a semi-batch gas-phase reactor utilizing NaCl as seed bed and at 85° C. The pressure in the reactor was held constant by continuously feeding ethylene to make up for consumption due to polymerization. After 30 minutes, the polymer produced (61 g) was separated from the seed bed and the efficiency of the catalyst was calculated and normalized to 1 h and 150 psi (1034 kPa) monomer concentration as shown in Table 1.

Comparative Example 2

10 wt-% Trimethyl aluminum in isopentane (284 cm$^3$) was measured into a 500-cc flask at 0° C. 20 g of Davison 948 silica having Loss-On-Ignition of 11.14% was added slowly to the TMA solution. After all the silica had been added, the temperature was raised to 35° C. and the isopentane solvent was removed under vacuum to give a free-flowing powder. A sample of the powder (10 g) was suspended in 60 cm$^3$ heptane at 60° C. To this slurry was added a solution of 0.2925 g ("PentCp)$_2$ZrCl$_2$ in toluene (35 cm$^3$). Stirring was continued for 1.5 h and then the solvent was removed under vacuum to give a free-flowing catalyst. This catalyst was then used to polymerize ethylene as described in Example 1. The polymer formed has Mw of 141,900 and Mw/Mn of 2.6.

Comparative Example 3

10 wt-% Trimethyl aluminum in isopentane (563 cm$^3$) was measured into a 1-liter flask at 0° C. 20 g of Davison 948 silica having Loss-On-Ignition of 11.14% was added slowly to the TMA solution. After all the silica had been added, the temperature was raised to 35° C. and the isopentane solvent was removed under vacuum to give a free-flowing powder. A sample of the powder ( 10 g) was suspended in 60 cm$^3$ heptane at 60° C. To this slurry was added a solution of 0.2925 g ("PentCp)$_2$ZrCl$_2$ in toluene (35 cm3). Stirring was continued for 1.5 h and then the solvent was removed under vacuum to give a free-flowing catalyst. This catalyst was then used to polymerize ethylene as described in Example 1.

Comparative Example 4

10 wt-% Trimethyl aluminum in isopentane (844 cm$^3$) was measured into a 1-liter flask at 0° C. 20 g of Davison 948 silica having Loss-On-Ignition of 11.14% was added slowly to the TMA solution. After all the silica had been added, the temperature was raised to 35° C. and the isopentane solvent was removed under vacuum to give a free-flowing powder. A sample of the powder (10 g) was suspended in 60 cm$^3$ heptane at 60° C. To this slurry was added a solution of 0.2925 g ("PentCp)$_2$ZrCl$_2$ in toluene (35 era3). Stirring was continued for 1.5 h and then the solvent was removed under vacuum to give a free-flowing catalyst. This catalyst was then used to polymerize ethylene as described in Example 1.

Example 5

10 wt-% Trimethyl aluminum in isopentane (2100 cm$^3$) was measured into a 3-liter flask at 0° C. 150 g of Davison 948 silica having Loss-On-Ignition of 11.14% was added slowly to the TMA solution. After all the silica had been added, the temperature was raised to 35° C. and the isopentane solvent was removed and replaced with heptane such that the concentration of solids in the heptane slurry was 0.33 g/cm$^3$. The support slurry was stored under a nitrogen blanket for a period of 3400 h at ambient conditions in a 500 cc flask at 60° C. A sample of the heptane slurry corresponding to 10 g of support was measured into a 500-cc flask at 60° C. To this slurry was added a solution of 0.2925 g ("PentCp)$_2$ZrCl$_2$ in toluene (35 cm$^3$). Stirring was continued for 1 h and then the solvent was removed under vacuum to give a free-flowing catalyst. This catalyst was then used to polymerize ethylene as described in Example 1. The polymer formed has Mw of 142,200 and Mw/Mn of 2.5.

Example 6

A sample (corresponding to 20 g of support) of the heptane treated-support slurry described in example 5 above which had been stored under nitrogen blanket for a period of 360 h at ambient conditions was measured into a 500-cc flask at 60° C. To this slurry was added a solution of 0.51 g ("PrCp)$_2$ZrCl$_2$ in toluene (30 cm$^3$). Stirring was continued for 1 h and then the solvent was removed under vacuum to give a free-flowing catalyst. This catalyst was then used to polymerize ethylene as described in Example 1.

Example 7

A sample (corresponding to 20 g of support) of the heptane treated-support slurry described in example 5 above which had been stored under nitrogen blanket for a period of 840 h at ambient conditions was measured into a 500-cc flask at 60° C. To this slurry was added a solution of 0.51 g ("PrCp)$_2$ZrCl$_2$ in toluene (30 cm$^3$). Stirring was continued for 1 h and then the solvent was removed under vacuum to give a free-flowing catalyst. This catalyst was then used to polymerize ethylene as described in Example 1.

Example 8

A solution (3180 cm$^3$) of 10 wt-% trimethyl aluminum in isopentane was measured into a 5-liter flask at 0° C. 150 g of Davison 948 silica having Loss-On-Ignition of 11.14% was added slowly to the TMA solution. After all the silica had been added, the temperature was raised to 35° C. and the isopentane solvent was removed and replaced with heptane such that the concentration of solids in the heptane slurry was 0.33 g/cm$^3$. After 312 h storage under ambient conditions and nitrogen blanket, a sample of the heptane slurry corresponding to 20 g of support was measured into a 500-cc flask at 60° C. To this slurry was added a solution of 0.51 g ("PentCp)$_2$ZrCl$_2$ in toluene (30 cm$^3$). Stirring was continued for 1 h and then the solvent was removed under vacuum to give a flee-flowing catalyst. This catalyst was then used to polymerize ethylene as described in Example 1.

Example 9

A sample (corresponding to 20 g of support) of the heptane treated-support slurry described in example 8 above which had been stored under nitrogen blanket for a period of 648 h at ambient conditions was measured into a 500-cc flask at 60° C. To this slurry was added a solution of 0.51 g ("PrCp)$_2$ZrCl$_2$ in toluene (30 cm$^3$). Stirring was continued for 1 h and then the solvent was removed under vacuum to give a free-flowing catalyst. This catalyst was then used to polymerize ethylene as described in Example 1.

Example 10

A sample (corresponding to 20 g of support) of the heptane treated-support slurry described in example 8 above which had been stored under nitrogen blanket for a period of 840 h at ambient conditions was measured into a 500-cc flask at 60° C. To this slurry was added a solution of 0.51 g ("PrCp)$_2$ZrCl$_2$ in toluene (30 cm$^3$). Stirring was continued for 1 h and then the solvent was removed under vacuum to give a free-flowing catalyst. This catalyst was then used to polymerize ethylene as described in Example 1.

From Table 1, Examples 1–5 were prepared using the same metallocene ("Pentyl $C_p)_2ZrCl_2$ and Examples 6–10 were prepared using the same metallocene ("Propyl $C_p)_2ZrCl_2$. Now referring to Examples 1–5, in Comparative Examples 1–4 the trimethyl aluminum/alumoxane loadings were increased from 1.2 to 6.0 and as expected activity increased slightly as can be seen in the Table under the heading catalyst efficiency. However, Example 5 illustrates that at lower loadings using the aged activator of the invention catalyst efficiency is substantially increased over the comparative examples, especially over Comparative Example 2 having the same loading. This increase over Comparative Example 2 is over 35%.

Examples 6–10 of the invention illustrate that equal loadings using the activator of the invention aged for a different period of time results in a significant increase in catalyst activity as measured by catalyst efficiency. Examples 6 and 7 having the same loading illustrate a 58% increase in efficiency by aging the activator for a period of from 360 hours to 840 hours. Also, Examples 8–10 all having the same loadings also illustrate the invention in that at 840 hours of aging a increase in catalyst efficiency is observed over aging the activator for 312 hours as in Example 8.

While the present invention has been described and illustrated by reference to particular embodiments, it will be appreciated by those of ordinary skill in the art that the invention lends itself to variations not necessarily illustrated herein. For example, it is within the scope of this invention to mix at least two of the catalysts of the invention or to use the catalyst of the invention with any other catalyst or catalyst system known in the art, for example a traditional Ziegler-Natta catalyst or catalyst system. Also the catalyst system of the invention can be used in a single reactor or in a series of reactors. For this reason, then, reference should be made solely to the appended claims for purposes of determining the true scope of the present invention.

TABLE 1

| Example | TMA:$H_2O$ (mole ratio) | Length of Aging (hours) | Catalyst Efficiency $g_{PE}/(g_{CAT}$ @ 150 psi) (1034 kPa) |
|---|---|---|---|
| Comparative 1 | 1.2 | 0 | 1271 |
| Comparative 2 | 2.0 | 0 | 1207 |
| Comparative 3 | 4.0 | 0 | 1305 |
| Comparative 4 | 6.0 | 0 | 1473 |
| 5 | 2.0 | 3400 | 1728 |
| 6 | 2.0 | 360 | 1728 |
| 7 | 2.0 | 840 | 2723 |
| 8 | 3.0 | 312 | 1760 |
| 9 | 3.0 | 648 | 2240 |
| 10 | 3.0 | 840 | 2526 |

What is claimed is:

1. A process for polymerizing olefins alone or in combination with one or more other olefins, said process comprising polymerizing in the presence of a catalyst system, said catalyst system comprising at least one metallocene catalyst component and at least one alkylalumoxane activator that has been in combination with an inorganic oxide support material and aged for 300 hours or more.

2. The process of claim 1 wherein the olefins are alpha-olefins having from 2 to 6 carbon atoms.

3. The process of claim 1 wherein the aged activator is methylalumoxane.

4. The process of claim 1 wherein the metallocene catalyst component is added to the reactor separately from the aged activator.

5. The process of claim 1 wherein the metallocene catalyst component is supported on the support.

6. The process of claim 1 wherein the metallocene catalyst component and the aged activator are introduced into the reactor in liquid form.

7. The process of claim 1 wherein the activator is aged for more than 672 hours.

8. The process of claim 1 wherein the activator is aged for more than 1000 hours.

9. The process of claim 1 wherein the support material comprises silica.

10. The process of claim 1 wherein the activator is initially formed in situ.

* * * * *